(No Model.)
S. WEBBER.
Rock Drill.
No. 240,346. Patented April 19, 1881.
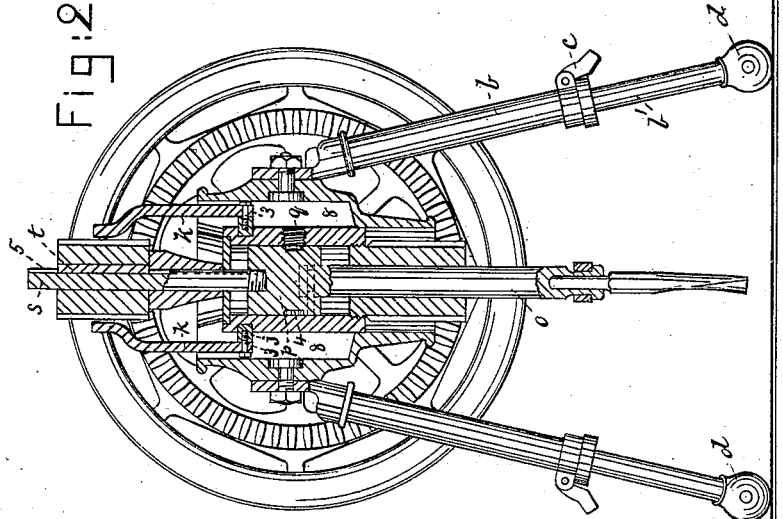
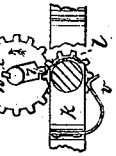
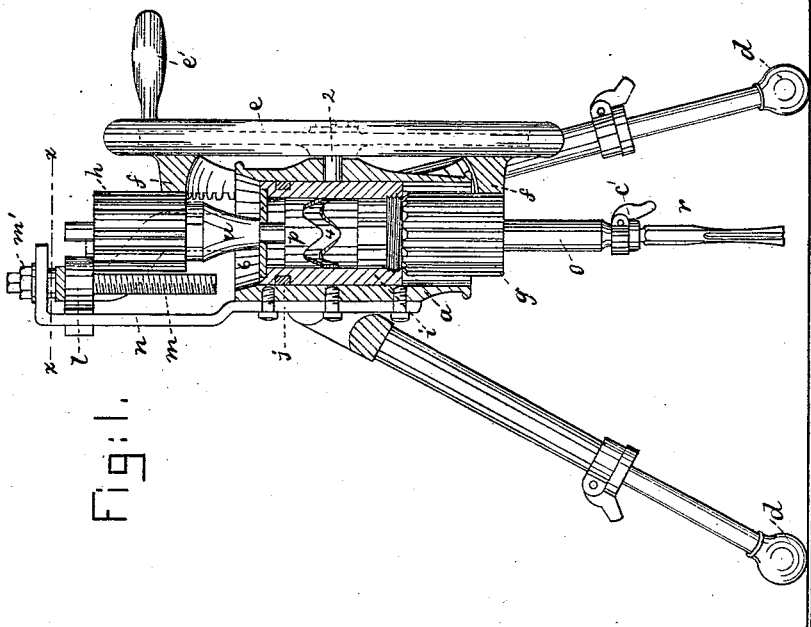
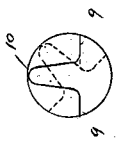
Witnesses
L. F. Connor.
Arthur Reynolds.
Inventor
Scott Webber,
by Crosby Gregory, Attys.

UNITED STATES PATENT OFFICE.

SCOTT WEBBER, OF GLOUCESTER, MASSACHUSETTS.

ROCK-DRILL.

SPECIFICATION forming part of Letters Patent No. 240,346, dated April 19, 1881.

Application filed March 5, 1881. (No model.)

*To all whom it may concern:*

Be it known that I, SCOTT WEBBER, of Gloucester, county of Essex, and State of Massachusetts, have invented an Improvement in Rock-Drills, of which the following description, in connection with the accompanying drawings, is a specification.

My invention relates to rock-drills, and has for its object to produce an effective hand-operated drill.

The invention consists, essentially, in mechanism, as hereinafter described, to impart to a drill an exceedingly rapid reciprocating movement, its blows being comparatively light and its movements short but very rapid.

It also consists in certain details of construction of the supporting-tripod, in the form of the drill employed, and in the feeding mechanism by which the drill is advanced into the rock.

The working parts are shown as supported in a frame-case mounted on a tripod in the usual manner, and fixed thereby relative to the rock that is to be drilled, the said case being cylindrical in shape. The main driving-wheel, provided with a handle or crank and weighted to give it sufficient momentum, is mounted on a bearing connected with the said frame-case at one side, the axis of the said wheel being at right angles to that of the said cylinder. This driving-wheel has a face-wheel gear, the teeth of which extend in toward the frame-case, and the said gear is of a diameter greater than the length of the frame-case, so that the teeth at the upper and lower portions of the said wheel extend in above and below the ends of the said case, toward the axis thereof, where they engage two pinions, rotating them in opposite directions as the driving-wheel is turned. The lower one of these pinions is connected with an internal cylinder fitted within the frame-cylinder as a bearing, and in which it rotates freely, and has a gradual longitudinal movement controlled by the feeding mechanism, as hereinafter described. The drill-shaft passes through and has a loose bearing in the said lower pinion, and is provided with a cam-hub fitting within the internal cylinder connected with the said lower pinion, the said hub being free to rotate and reciprocate independently in the said cylinder.

The said drill stock or shaft is extended up from its cam-hub above the top of the said cylinder, where the upper pinion is mounted on it and connected with it by a spline and feather, so as to cause the said drill-shaft to rotate with it, and at the same time to permit the said shaft to reciprocate independently of the said pinion. By this arrangement the lower pinion and connected cylinder revolve in one direction, while the upper pinion and drill-shaft and connected cam-hub rotate in the other direction. The cam-hub, which is shown as cylindrical in shape, is provided on its periphery with a wave-cam, in which a pin or roller connected with the internal cylinder is placed, so that as the said cylinder and hub rotate in opposite directions a rapid reciprocating movement is imparted to the said hub in the said cylinder. If, for example, the wave-cam has four independent undulations, there would be eight reciprocating movements imparted to the cam-hub and connected drill-stock in each complete rotation of either of the said pinions, (they having the same number of teeth,) and eight blows would be struck upon the rock.

The internal cylinder is supported upon a yoke that rests upon a feed-nut mounted on a feed-screw that is rigidly connected with the outer or frame cylinder. The said yoke is connected at its lower end with a ring which fits into an annular groove in the internal cylinder, to permit the free rotation of the said cylinder. The feed-nut is made externally as a toothed pinion and mounted on its screw just above and at the side of the upper pinion, before described, and the latter is provided with one or more feeding projections or teeth, that at each rotation engage the teeth of the feed-nut and rotate it on its screw, thereby causing it and the connected inner cylinder, with the pinion and drill-stock supported therewith, to move forward toward the rock, the rapidity of the feed being determined by the number of projections employed on the upper pinion. The two pinions are of an axial length equal to the amount that a given drill is to penetrate the rock, and as they are fed forward the teeth of the main driving-gear engage the different portions of the teeth of the said pinions.

The upper portion of the legs of the tripod are made tubular, and the lower portions slide telescopically therein, and are fastened at any given position by an eccentric cam or dog. The lower portions of the said legs are each provided with a large globular mass of lead, to enable them to be held from slipping by the roughness of the rock upon which the drill is set up, the weight of the said leaden masses also conducing to the stability of the drill when set up.

The cutting-edge of the drill is made of a peculiar shape, as hereinafter described and shown, by which it is caused to cut the rock and clear the drilled hole in its rapid rotary and reciprocating movement.

Figure 1 is a side elevation, partly in section, of a drill constructed in accordance with my invention; Fig. 2, a partial longitudinal section thereof on a plane at right angles to the plane of projection of Fig. 1; Fig. 3, a plan view of the feeding mechanism detached, the parts being in section on line $x$ $x$, Fig. 1; and Fig. 4, a view of the cutting-edge of the drill on a larger scale.

The main frame-case $a$ (shown as of cylindrical form) is mounted in the usual manner on the tripod-legs, consisting of two parts, $b$ $b'$, one made to slide telescopically within the other, to adjust the length of the said legs, and when extended the proper amount it is fastened by the eccentric-dog $c$, and thereby prevented from further movement. The legs $b'$ are provided at their lower ends with globular masses or feet $d$, of lead or of other suitable soft and heavy material, adapted to take a firm hold on the rough rock-surface, and thereby retain the apparatus fixed without danger of slipping while the drill is in operation.

The main driving-wheel $e$, provided with a suitable crank or handle, $e'$, and mounted on an axis at 2, fixed upon the frame-cylinder $a$, is provided with a face-gear, $f$, that completely surrounds the cylinder $a$, the teeth of which extend inward above and below the end of the said cylinder, to engage the pinions $g$ $h$ and impart to them a rotary motion in opposite directions.

The pinion $g$, that engages the lower portion of the driving-gear $f$, is rigidly connected with the drill-operating cylinder $i$, adapted to rotate in the frame-case $a$ as a bearing, and prevented from reciprocation or longitudinal movement therein (except for feeding the drill, as hereinafter described) by the ring $j$, connected at 3 with a yoke, $k$, passing upward at either side of the upper pinion, $h$, and resting on a feed-nut, $l$, mounted on the feed-screw $m$, supported on the bracket $n$, that is rigidly connected with the frame-cylinder $a$, as shown in Fig. 1.

The drill stock or shaft $o$ passes through the lower pinion, $g$, in which it is free to rotate and reciprocate, and is provided with a cam-hub, $p$, free to rotate and reciprocate in the drill-operating cylinder $i$, and provided with a waving cam-groove, 4, adapted to receive a pin or projection, $q$, (see Fig. 2,) fixed in the side of the drill-operating cylinder $i$, so that when the said cylinder and cam-hub $p$ revolve in opposite direction the said hub and connected drill-stock $o$ and drill $r$ thereon receive a reciprocating movement. The drill-stock $o$ and cam-hub $p$ thereon have an upward extension, $s$, passing through the upper pinion, $h$, and connected therewith by a key or feather, $t$, fitted in a spline or groove, 5, in the said extension $s$ of the drill-stock, which is thus caused to accompany the said pinion $h$ in its rotary movements, but is free to reciprocate independently thereof.

The pinion $h$ rests on a sleeve or hub, $u$, which has its bearing at 6 on the upper head of the drill-operating cylinder $i$, so that the said cylinder and pinions move in unison downward in the frame-case $a$ when operated by the feeding mechanism, as will now be described, while the drill cuts its way through the rock.

The feed-nut $l$ rests upon the top of the pinion $h$, and is itself provided with teeth, or made as a pinion and adapted to be engaged by the feeding-tooth 7, which is fixed upon the top of the pinion $h$ and rotates therewith. At each complete rotation of the pinion $h$ the tooth 7 engages one of the teeth of the feed-nut $l$ and turns it a short distance, thus causing it to travel downward on the feeding-screw $m$, and thereby cause the drill-operating cylinder $i$ to move downward a short distance in the frame-cylinder $a$ and feed the drill into the rock. A spring-finger, $v$, fixed to the cylinder-supporting yoke $k$, engages the teeth of the feed-nut $l$, causing it to be moved for the space of just one tooth each time that it is engaged by the projection 7, and retains the said nut in proper position to be engaged by the said projection.

Two longitudinal channels, 8, are made in the sides of the frame-cylinder $a$, to receive the arms of the yoke $k$ as it and the connected cylinder $i$ and drill-operating mechanism are fed down through the frame-cylinder $a$, and the pinions $g$ $h$ are made of such width, measured along their axis, that their teeth remain in engagement with those of the face-wheel $f$ in all positions in their feeding movement relative to the frame-cylinder $a$.

The cam-groove 4 is shown as provided with four undulations or waves, so that in a complete revolution of the pinions $g$ $h$ in opposite directions the drill will strike eight blows upon the rock, and will in the meanwhile have itself made a complete rotation, so that at each blow its cutting-edge will have been turned one-eighth of a revolution, or forty-five degrees, from the position occupied when it made the last blow. Its cutting-edge is shaped as shown in Fig. 4 relative to the hole to be cut, which is indicated by the dotted circle, the said edge being composed of two radial portions, 9, connected by a U-shaped portion, 10, at right angles thereto, and extending out to the edge of the hole to be cut. The portions of the cutting-edges 9 10 which lie toward the center of the hole project farther downward than the portions of the said edges near the circumference of the hole, as shown in Figs. 1 and 2. The dotted lines represent the position of the edge of the drill when striking the next blow after a blow has been struck in the position shown in full lines. By this shape of cutting-edge nearly the whole of the rock to be cut will be acted upon in a complete rotation of the drill and the hole will be effectually cleared.

The drill is secured in its socket by an eccentric-dog, $c'$, similar to the one employed to fix together the two portions $b\ b'$ of the tripod-legs.

If desired to feed the drill more rapidly, two or more feeding-teeth, 7, connected with the upper pinion, $h$, could be employed; or feeding-screws $m$ of different pitch may be used to properly control the feed, the said screws being readily detached from the supporting bracket or arm $n$, upon which they are fixed and held motionless by the check-nut $m'$. The feed-screw has a squared head, 12, to enable the drill to be quickly withdrawn from the drilled hole by rotating the said screw in the proper direction by a suitable crank or otherwise, the check-nut $m'$ being loosened for this purpose.

It will be seen that by my arrangement of two oppositely-rotating portions and a wave-cam acted upon thereby an exceedingly rapid vibration can be imparted to the drill, such operation being more effective than the heavier but much less rapid blows produced by hand-operative drills of ordinary construction.

If desired, the cam-groove 4 may be made on the interior of the cylinder $i$ and the stud or projection $q$ connected with the drill-shaft $o$, and various other modifications in construction might be made without departing from the principle of my invention—as, for instance, the lower portion, $o$, of the drill-stock might be connected with the cam-hub $p$ by an annular groove and pin therein, as indicated in dotted lines, Fig. 2, when desired that its rate of rotation shall be different from that of the pinion $h$.

If desired to run the drill more slowly, the pinion $g$ might be detached from the cylinder $i$ and the latter prevented from rotation by fixing it to the yoke $k$ or to the cylinder $a$ in such a way as to permit its longitudinal feeding movement therein, as by a projection from the outside engaging the groove or channel 8 in the frame-case $a$.

When the pinion $g$ and cylinder $i$ and the hub $p$ and extension are connected by screw-threads, as shown, the said screws should be of such "hand" or inclination as to tend to turn them in, in the regular operation of the drill. In this instance they will both be left-hand.

I claim—

1. In a rock-drill, the drill stock or shaft and drill-operating cylinder and hub, and means to rotate them simultaneously in opposite directions, combined with a wave-cam, whereby the said rotary movements are caused to produce a rapid reciprocatory movement in the said drill-stock, substantially as described.

2. In a rock-drilling apparatus, the driving-wheel and drill-operating cylinder and cam-hub therein, caused to rotate by the said driving-wheel in opposite directions, and the wave cam-groove and projection, whereby one of the said parts and the connected drill is made to reciprocate relative to the other part, substantially as described.

3. The rock-drill apparatus consisting of the following elements in combination: the frame-case and driving-wheel thereon, the drill-operating cylinder in the said case, and feed mechanism, whereby it is caused to move through the said case, and the drill-shaft and connected cam-hub in the said cylinder, the said cam-hub and cylinder being caused to rotate in opposite directions by the said driving-wheel, substantially as and for the purpose described.

4. In a rock-drill, the tripod-legs provided with feet consisting of globular masses of soft heavy material, substantially as described.

5. In a rock-drill, the tripod-legs consisting of two portions, $b\ b'$, one to slide telescopically in the other, combined with the eccentric fastening-dog $c$, whereby the said portions are fixed in the proper relative position, substantially as described.

6. The frame-case and face-wheel thereon, and the drill-operating cylinder and connected pinion engaged by one portion of the said face-wheel, combined with the cam-hub and connected pinion engaged by another portion of the said face-wheel, substantially as described.

7. The frame-case and feed-screw connected therewith and feed-nut on the said screw, combined with the drill-operating cylinder and its supporting-yoke, connected with the said cylinder, as described, to permit its independent rotary movement, but control its longitudinal movement in the frame-case, substantially as described.

8. In a rock-drill, the driving-wheel and pinions actuated thereby, and the drill-actuating cylinder connected with one of the said pinions and furnishing a bearing for the other, combined with a feed-screw and nut thereon, supporting the said cylinder, and means connected with one of the said pinions to rotate the said feed-nut, substantially as described.

9. The cylinder and cam-hub therein, and wave cam-groove and projection to enter it, combined with the drill-stock and its extension, connected with the said hub, and the pinion connected with the said extension by a feather and spline, to permit independent reciprocating movement, substantially as described.

10. The actuating face-wheel and two pinions engaged by opposite portions thereof, the said pinions being of proper width measured along their axis, as shown and described, to remain in engagement with the said wheel throughout their longitudinal feeding movement, substantially as described.

11. The feed-screw and externally-toothed feed-nut and drilling mechanism supported thereon, combined with the feeding-tooth to intermittingly engage the said feed-nut and spring-finger to control its movements, substantially as described.

In testimony whereof I have signed my name to this specification in the presence of two subscribing witnesses.

SCOTT WEBBER.

Witnesses:
    JOS. P. LIVERMORE,
    BERNICE J. NOYES.